(12) United States Patent
Masui et al.

(10) Patent No.: US 8,681,909 B2
(45) Date of Patent: Mar. 25, 2014

(54) MAXIMUM LIKELIHOOD DECODING METHOD AND RECEIVER

(75) Inventors: Hironari Masui, Yokohama (JP); Takashi Yano, Tokorozawa (JP); Takehiko Kobayashi, Fuchu (JP)

(73) Assignee: Hitachi Kokusai Electric Inc., Tokyo (JP)

(*) Notice: Subject to any disclaimer, the term of this patent is extended or adjusted under 35 U.S.C. 154(b) by 1187 days.

(21) Appl. No.: 12/182,315

(22) Filed: Jul. 30, 2008

(65) Prior Publication Data

US 2009/0034664 A1 Feb. 5, 2009

(30) Foreign Application Priority Data

Jul. 30, 2007 (JP) ................................. 2007-197545

(51) Int. Cl.
H04L 27/06 (2006.01)

(52) U.S. Cl.
USPC .......................................... 375/341; 375/262

(58) Field of Classification Search
CPC ............ H04L 25/0246; H04L 25/0256; H04L 1/0054; H04B 1/71057
USPC ......................................... 375/316, 340, 341
See application file for complete search history.

(56) References Cited

U.S. PATENT DOCUMENTS

| 7,826,571 B2* | 11/2010 | Kim et al. | 375/347 |
| 7,844,003 B2* | 11/2010 | Maeda et al. | 375/260 |
| 7,885,364 B2* | 2/2011 | Ito | 375/347 |
| 7,978,798 B2* | 7/2011 | Hwang et al. | 375/349 |
| 2006/0165192 A1* | 7/2006 | Ito | 375/267 |
| 2007/0230608 A1* | 10/2007 | Li | 375/267 |
| 2008/0095257 A1 | 4/2008 | Maeda et al. | |

FOREIGN PATENT DOCUMENTS

JP 2006-121348 5/2006

OTHER PUBLICATIONS

Kimura et al., "A multi-QR-decomposition assisted group detection algorithm for MIMO-OFDM", Institute of Electronics, Information and Communication Engineers (IEICE), pp. 115-120, RCS2006-124, Aug. 2006.

Kimura et al., "A multi-QR-decomposition assisted group detection for reduced-complexity-and-latency MIMO_OFDM receivers", The 17th Annual IEEE International Symposium on Personal, Indoor and Mobile Radio Communication (PIMRC'06).

* cited by examiner

Primary Examiner — Sophia Vlahos
(74) Attorney, Agent, or Firm — Antonelli, Terry, Stout & Kraus, LLP.

(57) ABSTRACT

Provided is a maximum likelihood decoding method that includes the steps of; firstly arranging channel impulse responses corresponding to the received signals in a plurality of different orders; secondly specifying the same number of parts as the plurality of different orders in which the channel impulse responses are arranged, so that the received signals are placed in each of the parts; thirdly generating channel matrices each having the channel impulse responses as matrix elements, by using the channel impulse responses arranged in the plurality of different orders, obtaining triangular matrices by applying QR decomposition to the generated channel matrices, and determining at least one combination candidate for each of the parts of the plurality of transmission signals by using the obtained triangular matrices; and fourthly selecting the combination candidates so that a Euclidean distance between the combination candidates determined in the third step is shortest.

2 Claims, 6 Drawing Sheets

| METHOD (QRM-MLD) | SIGNAL DIVISION COUNT | AMOUNT OF CALCULATION (COMPLEX-MULTIPLICATION COUNT) | |
| --- | --- | --- | --- |
| | | 4×4 ANTENNA | 6×6 ANTENNA |
| CONVENTIONAL | — | 3253 CALCULATIONS | 6862 CALCULATIONS |
| MULTIPLEX | 2 | 2522 CALCULATIONS | 5236 CALCULATIONS |
| | 3 | — | 4458 CALCULATIONS |

16QAM, M = 16

PRIOR ART  $c_1 \sim c_4$ :TRANSMISSION SIGNAL REPLICAS

MAXIMUM LIKELIHOOD DECODING METHOD AND RECEIVER

CLAIM OF PRIORITY

The present application claims priority from Japanese patent applications JP 2007-197545 filed on Jul. 30, 2007, the content of which are hereby incorporated by reference into this application.

FIELD OF THE INVENTION

This invention relates to a wireless communication method and a wireless communication apparatus for stable high-speed communication by using a plurality of transmission and reception antennas, and more particularly, to a maximum likelihood decoding process for received signals.

BACKGROUND OF THE INVENTION

A multiple-input multiple-output (MIMO) system in which wireless communication is performed by using a plurality of transmission and reception antennas achieves a high transmission rate. However, in order to achieve a high transmission rate, it is necessary to accurately separate and detect transmission-signal interferences from received signals. A maximum likelihood detection (MLD) method can be used to obtain the most excellent property, but it requires a large amount of calculation because of its complicated process. Therefore, a QRM-MLD process has been proposed as a practical approximation process.

According to a technology described in JP 2006-121348 A, two types of channel matrices both indicating impulse responses of transmission channels are prepared so as to have different element orders (for example, ascending order and descending order), the QRM-MLD process is performed using the channel matrices, and results obtained through the QRM-MLD process are combined, thereby improving the quality of a solution though the amount of calculation increases.

According to a technology described in "A multi-QR-decomposition assisted group detection algorithm for MIMO-OFDM", Ryota Kimura, Ryuhei Funada, Hiroshi Harada, and Shigeru Shimamoto, pp. 115-120, RCS2006-124, August 2006, Technical committee on radio communication systems, the Institute of Electronics, Information and Communication Engineers (IEICE), three or more types of channel matrices having different element orders are prepared and the QRM-MLD process is performed using the channel matrices.

Referring to FIGS. 7 and 8, a conventional QRM-MLD process will be described.

FIG. 7 is a configuration diagram of a QRM-MLD process unit that executes the conventional QRM-MLD process.

The QRM-MLD process unit includes an each-channel estimation unit 71, a channel matrix generation unit 72, a QR decomposition process unit 73, a signal conversion unit 74, and an MLD process unit 75.

The each-channel estimation unit 71 estimates a channel impulse response of each propagation channel by using a known pilot signal.

The channel matrix generation unit 72 generates a channel matrix having the channel impulse responses estimated by the each-channel estimation unit 71, as matrix elements.

The QR decomposition process unit 73 applies QR decomposition to the channel matrix generated by the channel matrix generation unit 72. For example, when the number of transmission antennas is four and the number of reception antennas is four, the relationship between transmission signals and reception signals is R=HT expressed by the following formula.

Formula 1

$$\begin{bmatrix} r_1 \\ r_2 \\ r_3 \\ r_4 \end{bmatrix} = \begin{bmatrix} h_{11} & h_{12} & h_{13} & h_{14} \\ h_{21} & h_{22} & h_{23} & h_{24} \\ h_{31} & h_{32} & h_{33} & h_{34} \\ h_{41} & h_{42} & h_{43} & h_{44} \end{bmatrix} \begin{bmatrix} t_1 \\ t_2 \\ t_3 \\ t_4 \end{bmatrix} \quad (1)$$

The QR decomposition applied to the channel matrix is H=QH' expressed by the following formula.

Formula 2

$$\begin{bmatrix} h_{11} & h_{12} & h_{13} & h_{14} \\ h_{21} & h_{22} & h_{23} & h_{24} \\ h_{31} & h_{32} & h_{33} & h_{34} \\ h_{41} & h_{42} & h_{43} & h_{44} \end{bmatrix} = \begin{bmatrix} q_{11} & q_{12} & q_{13} & q_{14} \\ q_{21} & q_{22} & q_{23} & q_{24} \\ q_{31} & q_{32} & q_{33} & q_{34} \\ q_{41} & q_{42} & q_{43} & q_{44} \end{bmatrix} \begin{bmatrix} h'_{11} & h'_{12} & h'_{13} & h'_{14} \\ 0 & h'_{22} & h'_{23} & h'_{24} \\ 0 & 0 & h'_{33} & h'_{34} \\ 0 & 0 & 0 & h'_{44} \end{bmatrix} \quad (2)$$

The QR decomposition is a unique matrix transformation. A first matrix Q in the right side of the formula is a unitary matrix (the matrix product of the unitary matrix and its complex conjugate transpose is equal to a identity matrix). A second matrix H' in the right side of the formula is an upper triangular matrix.

The complex conjugate transpose matrix of the matrix Q is expressed by Q*. When both sides of the formula (1) are multiplied by Q* from the left hand sides, the calculation is expressed by the following formula if the left side of the formula, Q*R, is expressed by Z and the right side of the formula is calculated as follows: Q*HT=Q*(QH')T=H'T.

[Formula 3]

$$Q* \begin{bmatrix} r_1 \\ r_2 \\ r_3 \\ r_4 \end{bmatrix} = \begin{bmatrix} z_1 \\ z_2 \\ z_3 \\ z_4 \end{bmatrix} = \begin{bmatrix} h'_{11} & h'_{12} & h'_{13} & h'_{14} \\ 0 & h'_{22} & h'_{23} & h'_{24} \\ 0 & 0 & h'_{33} & h'_{34} \\ 0 & 0 & 0 & h'_{44} \end{bmatrix} \begin{bmatrix} t_1 \\ t_2 \\ t_3 \\ t_4 \end{bmatrix} \quad (3)$$

The signal conversion unit 74 multiplies received signals by the complex conjugate transpose matrix of the unitary matrix, obtained through the QR decomposition, to convert the received signals into new signals. For example, the signal conversion unit 74 multiplies a received-signal matrix R by the complex conjugate transpose matrix Q* to transform the received-signal matrix R to a signal matrix Z, as expressed by the formula (3).

The MLD process unit 75 estimates transmission signals through an MLD process.

Next, details of the MLD process performed after the QR decomposition will be described. When $t_4$ is focused on in the formula (3), $z_4 = h'_{44} t_4$ is established. When a QPSK system is used for modulation and demodulation, four types of symbol candidates for a transmission signal are obtained corresponding to the number of levels. For each of the symbol candidates, "$h'_{44} t_4$" is calculated and the squared Euclidean distance from $z_4$ is calculated. It is estimated that the symbol candidate having the shortest Euclidean distance, among the calculated Euclidean distances, is most likely to be a proper transmission signal. Next, when $t_3$ is focused, $z_3=h_{33}'t_3+h_{34}'t_4$ is established. Therefore, for each of the combinations (4×4=16 types) of symbol candidates for $t_3$ and $t_4$, "$h_{33}'t_3+h_{34}'t_4$" is calculated and the squared Euclidean distance from $z_3$ is calculated. The Euclidean distance for each of 16 types of symbol candidates is calculated by combining the squared Euclidean distance from $z_3$ and the squared Euclidean distance from $z_4$. It is estimated that the symbol candidate having the shortest Euclidean distance, among the calculated Euclidean distances, is most likely to be a proper signal. The similar processing is repeated up to $t_1$ in the MLD process. It should be noted that distance calculation is required for 256 (fourth power of four) types of symbol candidates for $t_1$, and in general, when symbols of C levels are sent by N transmission antennas, a large amount of calculation is required for the same number of symbol candidates as the Nth power of C. In order to reduce the amount of calculation, an M algorithm is used.

FIG. 8 is an operation diagram of a process of a conventional M algorithm.

First, four types of signal replicas $C_1$ to $C_4$ are created as candidates for the transmission signal $t_4$. A signal replica is a signal temporarily set in a receiver. Specifically, the signal replica is a signal assumed to be a received signal based on an estimated channel impulse response.

Next, for each of the four types of signal replicas $C_1$ to $C_4$, four types of candidates for the transmission signal $t_3$ are created as signal replicas, to set 16 types of candidates for the combination of [$t_3$, $t_4$]. Then, the squared Euclidean distances between each of the set transmission signal candidates and a conversion signal Z are calculated, and combinations of ($t_3$, $t_4$) are narrowed down in an ascending order of the calculated squared Euclidean distances. For example, in a case where M=3 as shown in FIG. 8, combinations of ($t_3$, $t_4$) are narrowed down to three candidates.

Next, for the three transmission signal candidates, obtained by narrowing down the combinations of ($t_3$, $t_4$) for the transmission signal $t_3$, four types of signal replicas for the transmission signal $t_2$ are created, to set 12 types of candidates for the combination of [$t_2$, $t_3$, $t_4$]. Then, the squared Euclidean distances between each of the set transmission signal candidates and a conversion signal Z are calculated and combinations of ($t_2$, $t_3$, $t_4$) are narrowed down (M=3) in an ascending order of the calculated squared Euclidean distances.

Finally, for the transmission signal $t_1$, the process of the M algorithm is also applied to three transmission signal candidates obtained by narrowing down combinations of ($t_2$, $t_3$, $t_4$) for the transmission signal $t_2$, to finally determine the combination of ($t_1$, $t_2$, $t_3$, $t_4$) having the shortest squared Euclidean distance. In short, when combinations of candidates are narrowed down during the process, an optimum solution may be missed but an exponential increase in amount of calculation can be suppressed.

SUMMARY OF THE INVENTION

With the above-mentioned conventional technologies, candidates for an estimation solution are narrowed down to one in at least one QRM-MLD process and the candidate is used in the other QRM-MLD process. Accordingly, the calculation time increases, and an optimum solution may be missed because candidates for an estimation solution are narrowed down to one in advance.

Since different transmission signal estimation solutions are determined for channel matrices, there is a high possibility that an optimum solution cannot be reached by using a combination of overall transmission signals.

The representative aspects of this invention are as follows. That is, there is provided a maximum likelihood decoding method of separating received signals received by a plurality of antennas into a plurality of transmission signals, the method includes: a first step of arranging channel impulse responses corresponding to the received signals in a plurality of different orders; a second step of specifying the same number of parts as the plurality of different orders in which the channel impulse responses are arranged, so that the received signals are placed in each of the parts; a third step of generating channel matrices each having the channel impulse responses as matrix elements, by using the channel impulse responses arranged in the plurality of different orders, obtaining triangular matrices by applying QR decomposition to the generated channel matrices, and determining at least one combination candidate for each of the parts of the plurality of transmission signals by using the obtained triangular matrices; and a fourth step of selecting the combination candidates so that a Euclidean distance between the combination candidates determined in the third step is shortest.

In the fourth step of the maximum likelihood decoding method, the combination candidates for each of the parts are selected so that an integrated Euclidean distance of the combination candidates for the each of parts determined in the third step is shortest.

According to an aspect of this invention, the amount of calculation can be reduced by partially performing an MLD process for each channel matrix. Further, the quality of an estimation solution can be improved by applying an integrated MLD process to a plurality of candidates.

BRIEF DESCRIPTION OF THE DRAWINGS

The present invention can be appreciated by the description which follows in conjunction with the following figures, wherein.

DETAILED DESCRIPTION OF THE PREFERRED EMBODIMENT

Hereinafter, an embodiment of this invention will be described with reference to the accompanying drawings.

First Embodiment

A MIMO communication system according to a first embodiment of this invention will be described.

Figure 1A:
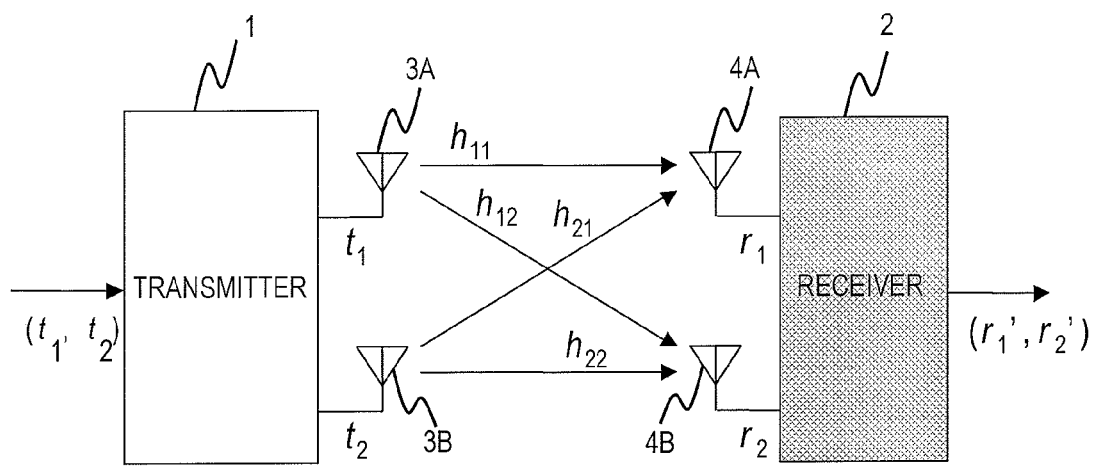
FIG. 1A is a configuration diagram of an MIMO communication system according to a first embodiment of this invention.

FIG. 1A is a configuration diagram of the MIMO communication system according to the first embodiment of this invention.

The MIMO communication system includes a transmitter 1, a receiver 2, transmission antennas 3 (3A and 3B), and reception antennas 4 (4A and 4B).

The transmitter 1 simultaneously sends transmission data items ($t_1$, $t_2$) in the form of transmission signals at an identical frequency by using the two different transmission antennas 3. It should be noted that the transmission signals are influenced by channel impulse responses ($h_{11}$ to $h_{22}$) of propagation channels.

The receiver 2 receives the signals, which have been influenced by the channel impulse responses ($h_{11}$ to $h_{22}$), by using the two different reception antennas 4. Since a plurality of transmission data items are mixed in the received signals, the receiver 2 performs a signal separation process to separate the corresponding mixed transmission signals from the received signals to obtain estimation signals ($r_1'$, $r_2'$).

It should be noted that the two transmission antennas 3 and the two reception antennas 4 are shown in FIG. 1A, but three or more different transmission antennas or reception antennas may be provided.

When the two transmission antennas 3 and the two reception antennas 4 are used, the relationship between transmission signals and reception signals is expressed by the following formula.

Formula 4

$$\begin{bmatrix} r_1 \\ r_2 \end{bmatrix} = \begin{bmatrix} h_{11} & h_{12} \\ h_{21} & h_{22} \end{bmatrix} \begin{bmatrix} t_1 \\ t_2 \end{bmatrix}$$

Figure 1B:
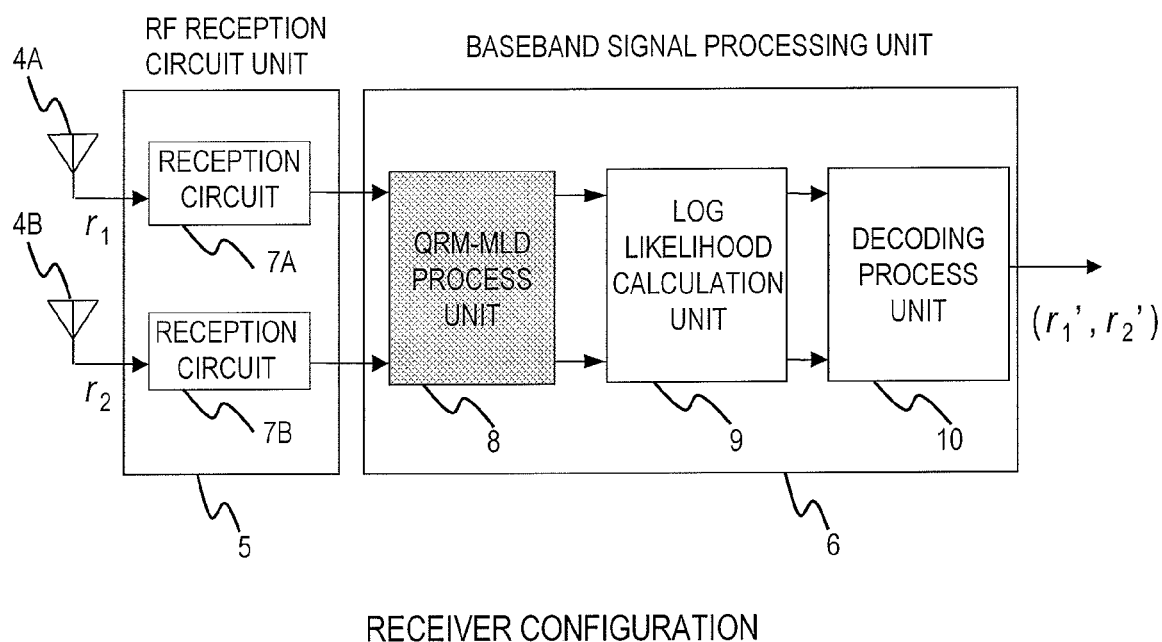
FIG. 1B is a configuration diagram of the receiver according to the first embodiment of this invention.

FIG. 1B is a configuration diagram of the receiver 2 according to the first embodiment of this invention.

The receiver 2 includes an RF reception circuit unit 5 and a baseband signal processing unit 6.

The RF reception circuit unit 5 includes reception circuits 7 (7A and 7B). The reception circuits 7 amplify the amplitudes of the signals received from the reception antennas 4 and input the amplified received signals to the baseband signal processing unit 6.

The baseband signal processing unit 6 includes a QRM-MLD process unit 8, a log likelihood calculation unit 9, and a decoding process unit 10.

The QRM-MLD process unit 8 separates transmission-signal interferences from the received signals. It should be noted that details of the QRM-MLD process unit 8 will be described later with reference to FIG. 2.

The log likelihood calculation unit 9 calculates the log likelihood of each signal obtained through the separation.

The decoding process unit 10 performs a decoding process such as turbo decoding, based on the calculated log likelihood.

In order to reduce the amount of calculation, the QRM-MLD process unit 8 of the first embodiment of this invention generates a plurality of channel matrices which have different element orders, and applies QR decomposition to each of the generated channel matrices, which have different element orders. Further, the QRM-MLD process unit 8 partially performs an MLD process by using an upper triangular matrix obtained through the QR decomposition applied to each of the channel matrices. At the last stage, in order to improve the quality of an optimum solution, the QRM-MLD process unit 8 performs an integrated MLD process by combining results obtained through the respective MLD processes. The above-mentioned process is called a multiplex QRM-MLD process, and an example case in which the multiplex count is two is shown in FIG. 2.

Figure 2:
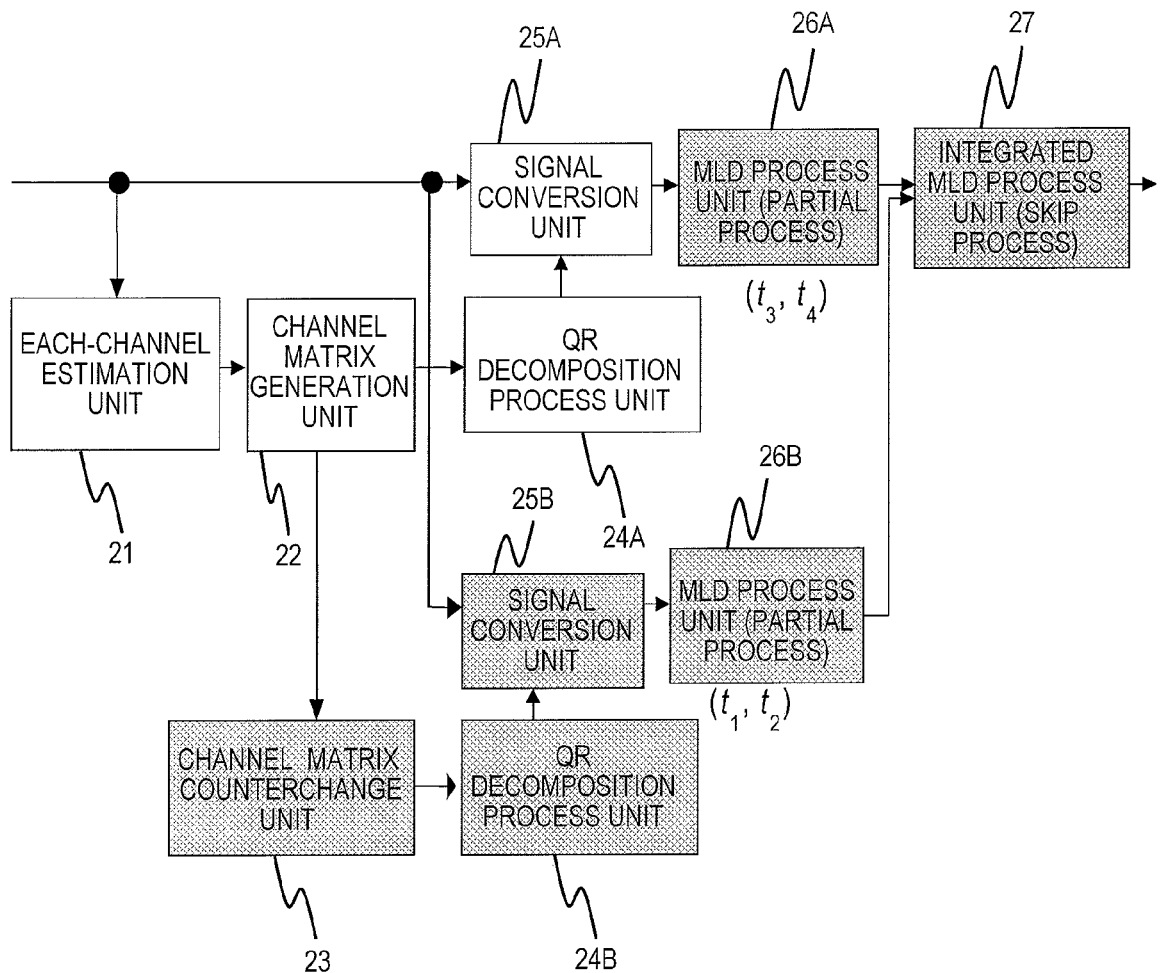
FIG. 2 is a configuration diagram of a QRM-MLD process unit according to the first embodiment of this invention.

FIG. 2 is a configuration diagram of the QRM-MLD process unit 8 according to the first embodiment of this invention.

The QRM-MLD process unit 8 includes an each-channel estimation unit 21, a channel matrix generation unit 22, QR decomposition process units 24 (24A and 24B), signal conversion units 25 (25A and 25B), a channel matrix counterchange unit 23, MLD process units 26 (26A and 26B), and an integrated MLD process unit 27.

The each-channel estimation unit 21 estimates a channel impulse response of each propagation channel by using a known pilot signal.

The channel matrix generation unit 22 generates a channel matrix having the channel impulse responses estimated by the each-channel estimation unit 21, as matrix elements.

The channel matrix counterchange unit 23 counterchanges the order in the channel matrix generated by the channel matrix generation unit 22. For example, the channel matrix counterchange unit 23 counterchanges the orders in the channel matrices included in the formula (2) to generate the channel matrices having the reverse orders.

The QR decomposition process unit 24A applies QR decomposition to the channel matrix generated by the channel matrix generation unit 22. The QR decomposition process unit 24B applies QR decomposition to the channel matrix having the reverse order and generated by the channel matrix counterchange unit 23, to obtain a formula (5).

Formula 5

$$\begin{bmatrix} h_{14} & h_{13} & h_{12} & h_{11} \\ h_{24} & h_{23} & h_{22} & h_{21} \\ h_{34} & h_{33} & h_{23} & h_{31} \\ h_{44} & h_{43} & h_{42} & h_{41} \end{bmatrix} = \begin{bmatrix} q'_{14} & q'_{13} & q'_{12} & q'_{11} \\ q'_{24} & q'_{23} & q'_{22} & q'_{21} \\ q'_{34} & q'_{33} & q'_{32} & q'_{31} \\ q'_{44} & q'_{43} & q'_{42} & q'_{41} \end{bmatrix} \begin{bmatrix} h''_{14} & h''_{13} & h''_{12} & h''_{11} \\ 0 & h''_{23} & h''_{22} & h''_{21} \\ 0 & 0 & h''_{32} & h''_{31} \\ 0 & 0 & 0 & h''_{41} \end{bmatrix} \quad (5)$$

The signal conversion units 25 each multiply the received signals by the complex conjugate transpose matrix of a unitary matrix obtained through the QR decomposition, to convert the received signals to new signals. For example, the signal matrix is transformed based on the QR decomposition expressed by the formula (5) to obtain a formula (6).

Formula 6

$$Q'' * \begin{bmatrix} r_1 \\ r_2 \\ r_3 \\ r_4 \end{bmatrix} = \begin{bmatrix} z'_1 \\ z'_2 \\ z'_3 \\ z'_4 \end{bmatrix} = \begin{bmatrix} h''_{14} & h''_{13} & h''_{12} & h''_{11} \\ 0 & h''_{23} & h''_{22} & h''_{21} \\ 0 & 0 & h''_{32} & h''_{31} \\ 0 & 0 & 0 & h''_{41} \end{bmatrix} \begin{bmatrix} t_4 \\ t_3 \\ t_2 \\ t_1 \end{bmatrix} \quad (6)$$

Each of the MLD process units 26 partially performs the MLD process. Specifically, the MLD process unit 26B performs the MLD process for $t_1$ and $t_2$ based on the formula (6) to determine transmission signal candidates. Similarly, the MLD process unit 26A performs the MLD process for $t_3$ and $t_4$ to narrow down the transmission signal candidates.

The integrated MLD process unit 27 performs the MLD process by combining the results obtained by the MLD process units 26. Specifically, the integrated MLD process unit 27 performs the MLD process based on the results of the transmission signal candidates for $t_1$ and $t_2$, and the transmission signal candidates for $t_3$ and $t_4$.

Figure 3:
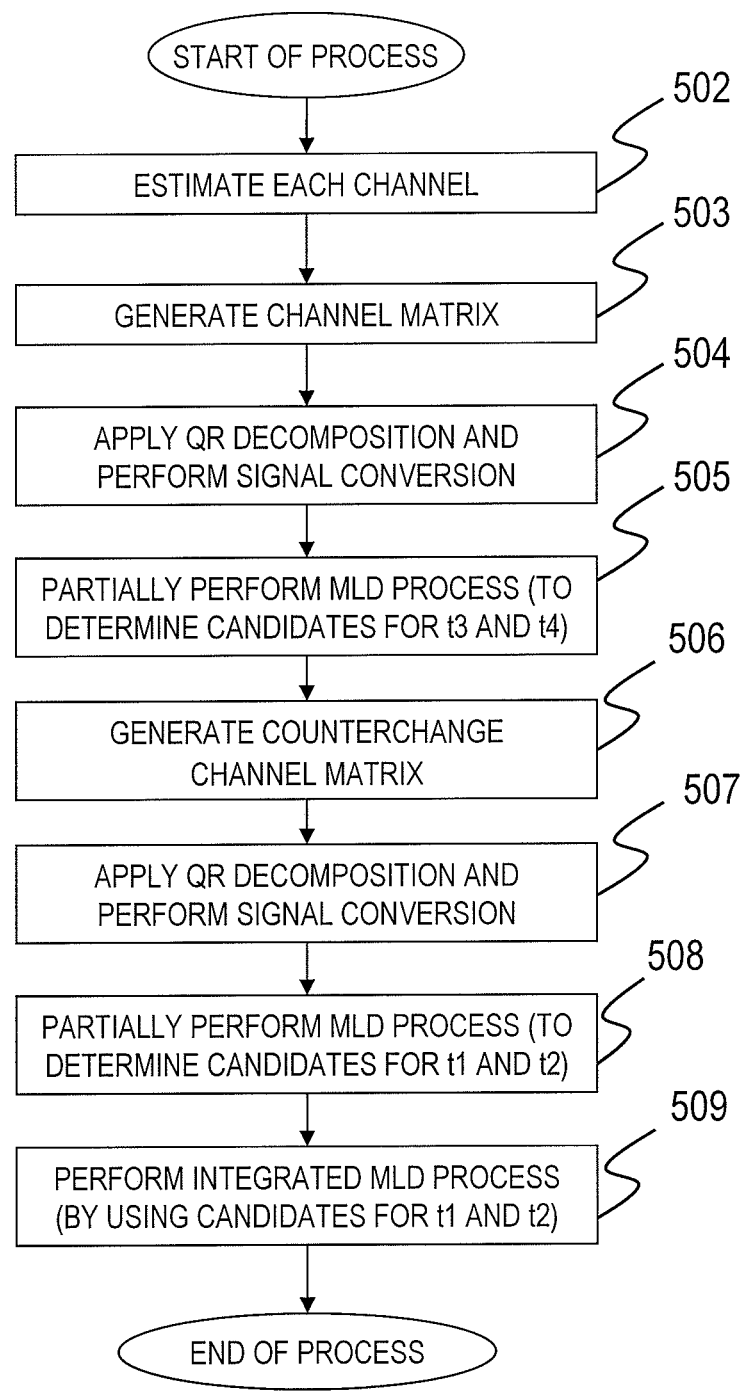
FIG. 3 is a flowchart of a multiplex QRM-MLD process according to the first embodiment of this invention.

FIG. 3 is a flowchart of the multiplex QRM-MLD process according to the first embodiment of this invention.

The multiplex QRM-MLD process is started when received signals are input to the QRM-MLD process unit 8.

First, the QRM-MLD process unit 8 estimates, in the each-channel estimation unit 21, propagation channels used between the transmission antennas 3 and the reception antennas 4 (502). Specifically, channel impulse responses of the propagation channels are estimated by using known pilot signals.

Next, the QRM-MLD process unit 8 generates a channel matrix in the channel matrix generation unit 22 (503). It should be noted that details of generation of a channel matrix will be described later with reference to FIG. 4.

The QRM-MLD process unit 8 applies QR decomposition to the generated channel matrix in the QR decomposition process unit 24A, and converts the received signals in the signal conversion unit 25A (504). Specifically, QR decomposition is applied to the generated channel matrix, and the received signals r are multiplied by the complex conjugate transpose matrix of a unitary matrix Q obtained through the QR decomposition, to obtain conversion signals Z.

The QRM-MLD process unit 8 applies the MLD process to the upper triangular matrix obtained through the QR decomposition and to the conversion signals Z obtained by the signal conversion unit 25A, to determine candidates for $t_3$ and $t_4$ (505). Specifically, the MLD process unit 26A performs the MLD process based on the upper triangular matrix H' obtained through the QR decomposition and the conversion signals Z until candidates for the transmission signals $t_3$ and $t_4$ are determined (the MLD process is not performed for the transmission signals $t_1$ and $t_2$).

The QRM-MLD process unit 8 counterchanges, in the counterchange matrix counterchange unit 23, the channel matrix generated in Step 503 to generate a new channel matrix (having the reverse order, for example) (506). The QRM-MLD process unit 8 applies QR decomposition to the counterchanged channel matrix in the QR decomposition process unit 24B, and converts the received signals in the signal conversion unit 25B (507).

The QRM-MLD process unit 8 applies the MLD process to the upper triangular matrix obtained by applying the QR decomposition to the counterchanged channel matrix and to the conversion signals, to determine candidates for $t_1$ and $t_2$ (508). Specifically, the MLD process unit 26B performs the MLD process until candidates for the transmission signals $t_1$ and $t_2$ are determined.

The QRM-MLD process unit 8 uniquely determines estimation values of the transmission signals $t_1$ to $t_4$ based on the candidates for the transmission signals $t_3$ and $t_4$ determined in Step 505 and the candidates for the transmission signals $t_1$ and $t_2$ determined in Step 508 (509). Specifically, the Euclidean distances for the candidates for the transmission signals $t_3$ and $t_4$ determined in Step 505 and the Euclidean distances for the candidates for the transmission signals $t_1$ and $t_2$ determined in Step 508 are calculated, and candidates for the transmission signals $t_1$ to $t_4$ having the integrated shortest Euclidean distances are determined to be estimation values. The QRM-MLD process unit 8 ends the process.

Generation of a channel matrix is now discussed. In a case where the absolute value of $h_{44}'$ which is a lower right diagonal term of the upper triangular matrix shown in the formula (3), obtained through the QR decomposition, and the absolute value of $h_{41}''$ which is a lower right diagonal term of the upper triangular matrix shown in the formula (6), obtained through the QR decomposition, are each small, since noise is included in transmission signals, when a candidate for the transmission signal $t_4$ shown in the formula (3) and a candidate for the transmission signal $t_1$ shown in the formula (6) are to be determined, the influence of the noise becomes larger to increase errors. Therefore, it is more effective to generate each channel matrix in such an order that the absolute value of a lower right diagonal term of the matrix is as large as possible (for example, a smaller one of the absolute values of two lower right diagonal terms is the maximum), because the influence of noise exerted upon determining a candidate for a transmission signal is small.

Hereinafter, a process of generating a channel matrix will be described specifically.

Figure 4:
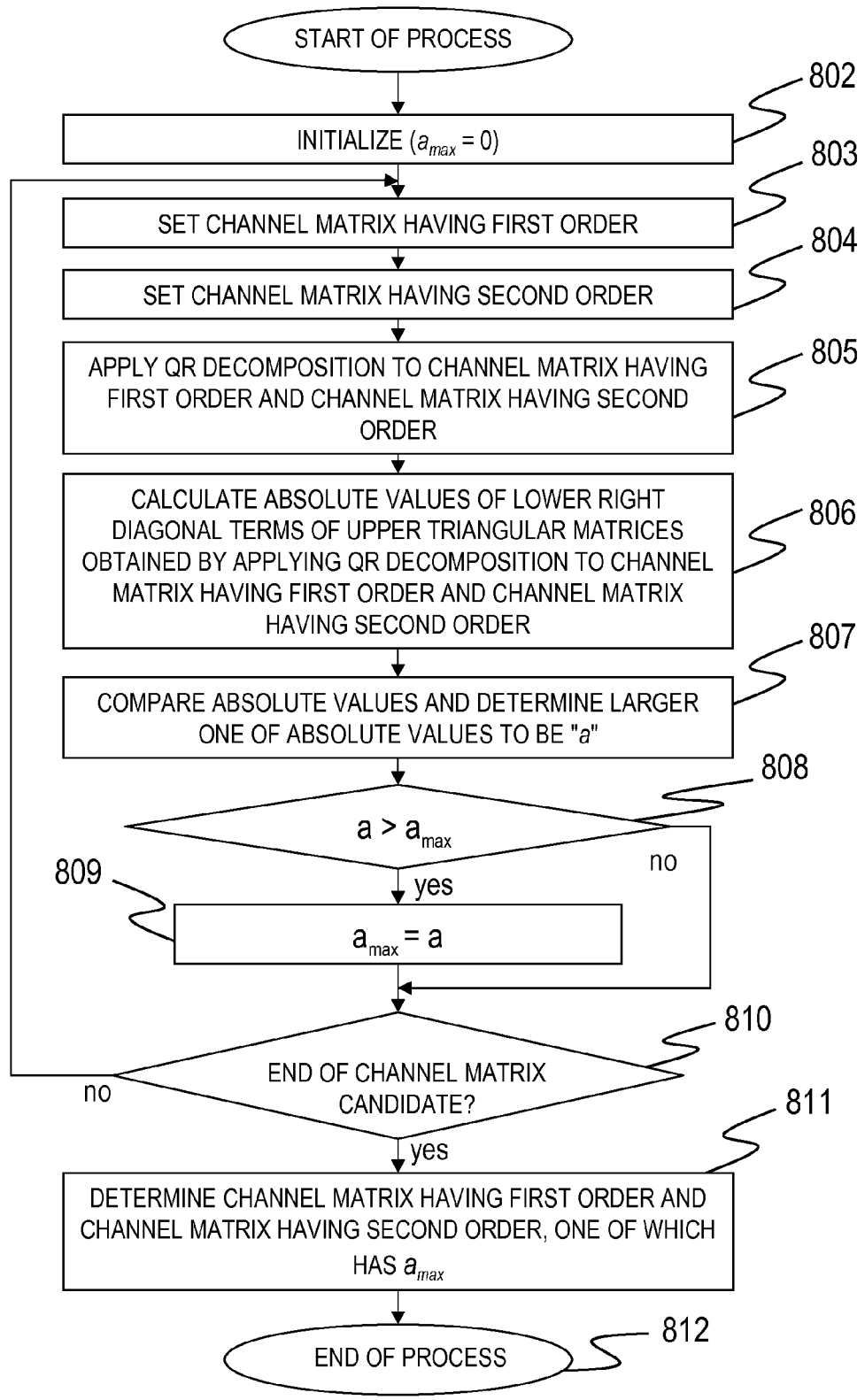
FIG. 4 is a flowchart of a channel matrix setting process according to the first embodiment of this invention.

FIG. 4 is a flowchart of a channel matrix setting process according to the first embodiment of this invention.

First, the QRM-MLD process unit 8 initializes a variable used in the channel matrix setting process ($\alpha_{max}=0$) (802).

Next, the QRM-MLD process unit 8 sets a channel matrix having a first order based on estimated channel impulse responses (803). Further, the QRM-MLD process unit 8 sets a channel matrix having a second order different from the first order of the channel matrix set in Step 803 (804).

The QRM-MLD process unit 8 applies QR decomposition to the set channel matrix having the first order and channel matrix having the second order (805).

The QRM-MLD process unit 8 calculates the absolute values of lower right diagonal terms of upper triangular matrices obtained through the QR decomposition applied to the channel matrix having the first order and the channel matrix having the second order (806).

The QRM-MLD process unit 8 compares the calculated absolute values of the lower right diagonal terms of the upper triangular matrices of the channel matrix having the first order and the channel matrix having the second order, and determines a larger one of the absolute values to be "$\alpha$" (807).

The QRM-MLD process unit 8 compares "$\alpha$" with the variable $\alpha_{max}$ to determine whether "$\alpha$" is larger than $\alpha_{max}$ (808). When "$\alpha$" is larger than $\alpha_{max}$, the QRM-MLD process unit 8 advances to Step 809. On the other hand, when "$\alpha$" is not larger than $\alpha_{max}$, the QRM-MLD process unit 8 advances to Step 810.

The QRM-MLD process unit 8 sets $\alpha_{max}$ to "$\alpha$" (809).

The QRM-MLD process unit 8 determines whether there is a candidate for a channel matrix (810). When there is a candidate for a channel matrix, the QRM-MLD process unit 8 returns to Step 803. On the other hand, when there is no candidate for a channel matrix, the QRM-MLD process unit 8 advances to Step 811.

The QRM-MLD process unit 8 determines the channel matrix having the first order and the channel matrix having the second order, one of which has $\alpha_{max}$ (811). The QRM-MLD process unit 8 ends the process.

Figures 5, 6:
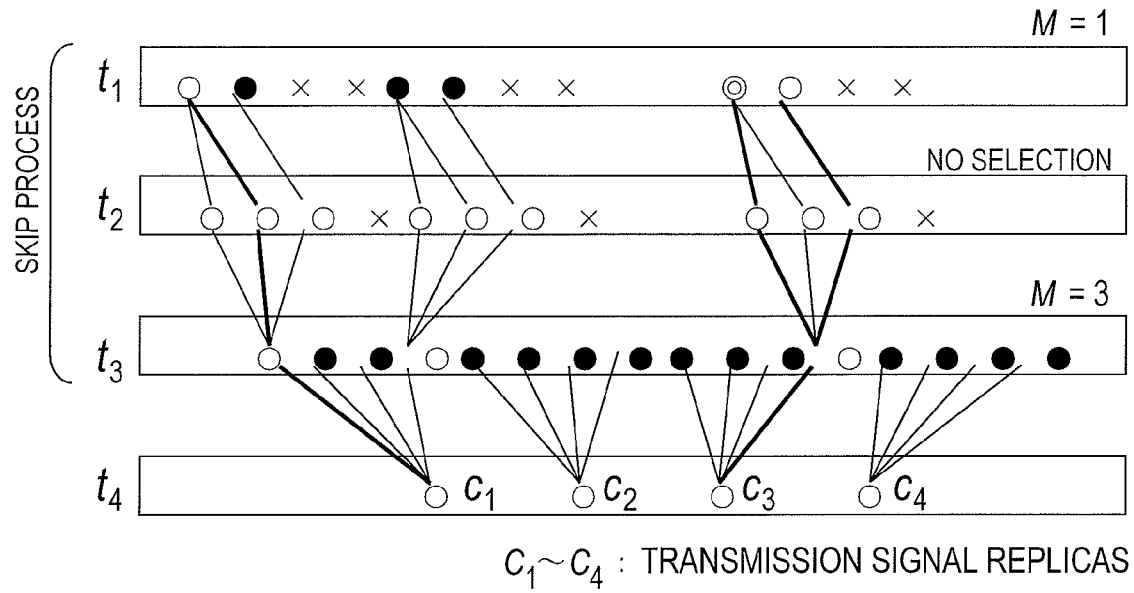
FIG. 5 is an operation diagram of an integrated MLD process according to the first embodiment of this invention.
FIG. 6 is an evaluation diagram showing a comparison of the amount of calculation between the first embodiment of this invention and a conventional technology.
Figure 7:
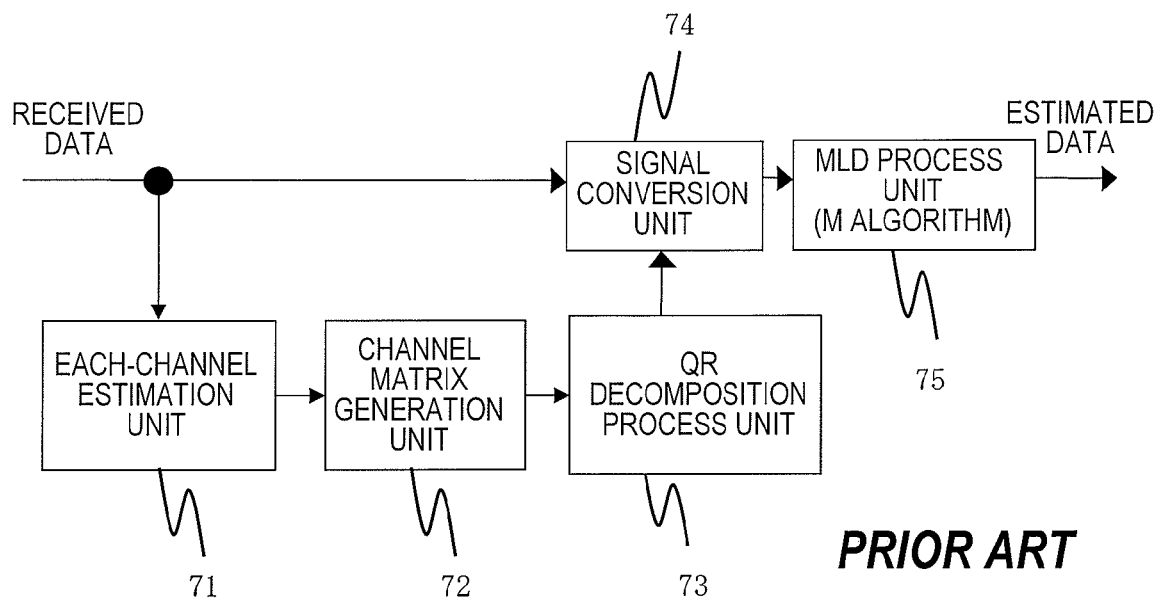
FIG. 7 is a configuration diagram of a QRM-MLD process unit that executes the conventional QRM-MLD process.
Figure 8:
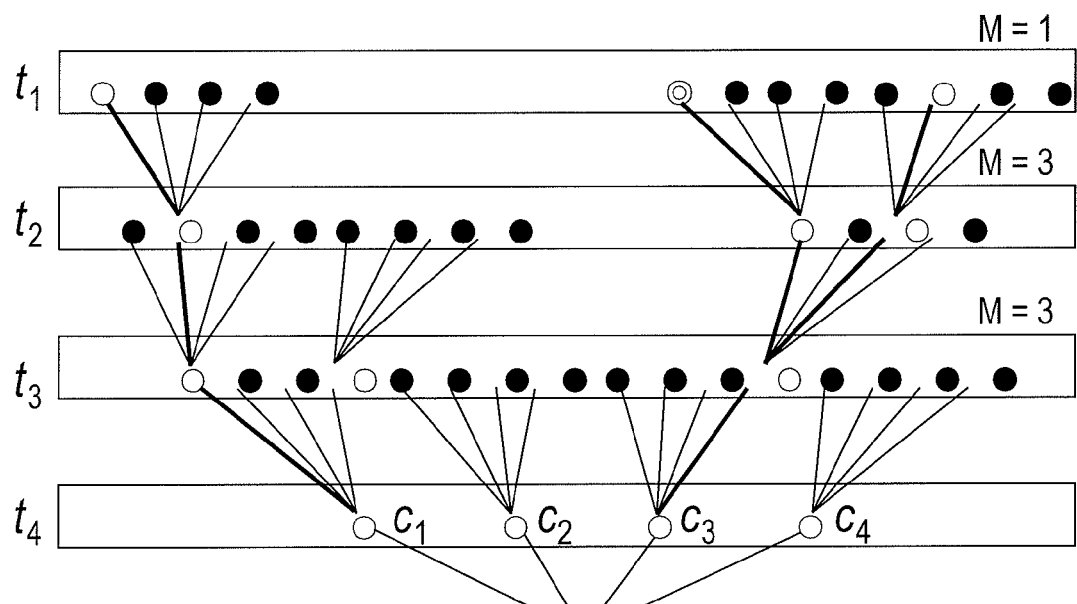
FIG. 8 is an operation diagram of a process of a conventional M algorithm.

FIG. 5 is an operation diagram of the integrated MLD process according to the first embodiment of this invention.

The MLD process is performed for $t_3$ and $t_4$ by using the M algorithm. The MLD process is omitted for $t_1$ and $t_2$ (skip process) because another MLD process is performed to determine a plurality of candidates for transmission signals $t_1$ and $t_2$. Specifically, the MLD process is first performed for $t_3$ and $t_4$ to determine a plurality of candidates for $t_3$ and $t_4$. Next, when the plurality of candidates for $t_1$ and $t_2$ determined in advance by the other MLD process are selected, the MLD process is performed for the plurality of candidates for $t_1$ and $t_2$, so that it is unnecessary to apply a new MLD process to all signal replicas for $t_1$ and $t_2$, and, as a result, the MLD process for $t_1$ and $t_2$ can be partially omitted.

When the integrated MLD process is performed after ones of the candidates determined through the MLD process applied to $t_1$ and $t_2$ and the candidates determined through the MLD process applied to $t_3$ and $t_4$ are narrowed down to one based on the Euclidean distances calculated through the MLD process, the amount of calculation can be reduced though the quality of an optimum solution may deteriorate. For example, when one candidate is determined through the MLD process applied to $t_3$ and $t_4$, a process for $t_3$ and $t_4$ is skipped and the MLD process is applied to $t_1$ and $t_2$ in the integrated MLD process, whereby the amount of calculation is reduced by skipping the process in the latter stage of a tree structure shown in FIG. 5.

FIG. 6 is an evaluation diagram showing a comparison of the amount of calculation between the first embodiment of this invention and a conventional technology.

When 16 QAM is used as a modulation and demodulation system, and the number of transmission signal candidates to be selected is 16, complex-multiplication counts are compared between a case where 4×4 transmission and reception antennas (four transmission antennas and four reception antennas) are used and a case where 6×6 transmission and reception antennas (six transmission antennas and six reception antennas) are used.

Processes to be considered in making the comparison include QR decomposition, generation of signal replicas, and calculation of squared Euclidean distances. In a case of N transmission antennas, C levels of modulation and demodulation, S candidates to be selected, and a multiplex count of G, the complex-multiplication count needs to be about N cubic in the QR decomposition. Further, an amount of calculation of C+SC(N/G−1)(N/G+2)/2 is required in generating signal replicas. Further, an amount of calculation of C+SC(N/G−1) is required in calculating squared Euclidean distances.

With the conventional technology, 3253 calculations are performed for 4×4 transmission and reception antennas, and 6862 calculations are performed for 6×6 transmission and reception antennas. The amount of calculation increases by approximately the square of 10 multiplied by the number of transmission and reception antennas.

On the other hand, when the signal division (multiplex) count is two in this invention, 2522 calculations are performed for 4×4 transmission and reception antennas, and 5236 calculations are performed for 6×6 transmission and reception antennas. It is found that the amount of calculation is reduced (by 22% to 24%) compared with the conventional technology. This is because the amount of calculation required for the QR decomposition doubles, but the amount of calculation required for the generation of signal replicas and the calculation of the squared Euclidean distances in the MLD process is significantly reduced compared with the increase in QR decomposition. It should be noted that, when the signal division (multiplex) count is three for 6×6 transmission and reception antennas, the QR decomposition is performed three times to determine, in each time, signal candidates for a combination of two transmission signals, and the integrated MLD process is performed, thereby executing maximum likelihood decoding. Formulae (7) to (9) show signal conversion formulae used when the signal division count is three.

Formula 7

$$Q*\begin{bmatrix}r_1\\r_2\\r_3\\r_4\\r_5\\r_6\end{bmatrix} = \begin{bmatrix}z_1\\z_2\\z_3\\z_4\\z_5\\z_6\end{bmatrix} = \begin{bmatrix}h'_{11} & h'_{12} & h'_{13} & h'_{14} & h'_{15} & h'_{16}\\0 & h'_{22} & h'_{23} & h'_{24} & h'_{25} & h'_{26}\\0 & 0 & h'_{33} & h'_{34} & h'_{35} & h'_{36}\\0 & 0 & 0 & h'_{44} & h'_{45} & h'_{46}\\0 & 0 & 0 & 0 & h'_{55} & h'_{56}\\0 & 0 & 0 & 0 & 0 & h'_{66}\end{bmatrix}\begin{bmatrix}t_1\\t_2\\t_3\\t_4\\t_5\\t_6\end{bmatrix} \quad (7)$$

Formula 8

$$Q*\begin{bmatrix}r_1\\r_2\\r_3\\r_4\\r_5\\r_6\end{bmatrix} = \begin{bmatrix}z_1\\z_2\\z_3\\z_4\\z_5\\z_6\end{bmatrix} = \begin{bmatrix}h''_{15} & h''_{16} & h''_{11} & h''_{12} & h''_{13} & h''_{14}\\0 & h''_{26} & h''_{21} & h''_{22} & h''_{23} & h''_{24}\\0 & 0 & h''_{31} & h''_{32} & h''_{33} & h''_{34}\\0 & 0 & 0 & h''_{42} & h''_{43} & h''_{44}\\0 & 0 & 0 & 0 & h''_{53} & h''_{54}\\0 & 0 & 0 & 0 & 0 & h''_{64}\end{bmatrix}\begin{bmatrix}t_5\\t_6\\t_1\\t_2\\t_3\\t_4\end{bmatrix} \quad (8)$$

Formula 9

$$Q*\begin{bmatrix}r_1\\r_2\\r_3\\r_4\\r_5\\r_6\end{bmatrix} = \begin{bmatrix}z_1\\z_2\\z_3\\z_4\\z_5\\z_6\end{bmatrix} = \begin{bmatrix}h'''_{13} & h'''_{14} & h'''_{15} & h'''_{16} & h'''_{11} & h'''_{12}\\0 & h'''_{24} & h'''_{25} & h'''_{26} & h'''_{21} & h'''_{22}\\0 & 0 & h'''_{35} & h'''_{36} & h'''_{31} & h'''_{32}\\0 & 0 & 0 & h'''_{46} & h'''_{41} & h'''_{42}\\0 & 0 & 0 & 0 & h'''_{51} & h'''_{52}\\0 & 0 & 0 & 0 & 0 & h'''_{62}\end{bmatrix}\begin{bmatrix}t_3\\t_4\\t_5\\t_6\\t_1\\t_2\end{bmatrix} \quad (9)$$

Specifically, the MLD process is partially performed for $(t_5, t_6)$ based on the formula (7). The MLD process is partially performed for $(t_3, t_4)$ based on the formula (8). The MLD process is partially performed for $(t_1, t_2)$ based on the formula (9). The integrated MLD process is performed based on results of transmission signal candidates determined by partially performing the MLD processes, to perform maximum likelihood decoding. It should be noted that, when the signal division count is three, the amount of calculation can be reduced to 4458 times (reduced by 35%).

While the present invention has been described in detail and pictorially in the accompanying drawings, the present invention is not limited to such detail but covers various obvious modifications and equivalent arrangements, which fall within the purview of the appended claims.

What is claimed is:

1. A maximum likelihood decoding method of separating received signals received by a plurality of antennas into a plurality of transmission signals, using a maximum likelihood decoding apparatus, comprising the steps of:

a first step of arranging channel impulse responses corresponding to the received signals in a plurality of different orders;

a second step of specifying a same number of parts as the plurality of different orders in which the channel impulse responses are arranged, wherein the received signals are placed in each of the parts;

a third step of generating channel matrices each having the channel impulse responses as matrix elements, by using the channel impulse responses arranged in the plurality of different orders, obtaining triangular matrices by applying QR decomposition to the generated channel matrices, and determining at least one combination candidate for each of parts of the plurality of transmission signals by using the obtained triangular matrices; and a fourth step of selecting the combination candidates so that a Euclidean distance between the combination candidates determined in the third step is shortest;

wherein:

in the first step, the channel impulse responses corresponding to the received signals are arranged in a first order and in a second order that is different from the first order;

in the second step, a first part and a second part are specified, wherein the received signals are placed in the first part and the second part;

the third step includes the steps of:

generating a channel matrix having the channel impulse responses as matrix elements by using the channel impulse responses arranged in the first order, obtaining a triangular matrix by applying the QR decomposition to the generated channel matrix, and determining at least one combination candidate for a first part of the plurality of transmission signals by using the obtained triangular matrix; and generating a channel matrix having the channel impulse responses as the matrix elements by using the channel impulse responses arranged in the second order, obtaining a triangular matrix by applying the QR decomposition to the generated channel matrix, and determining at least one combination candidate for a second part of the plurality of transmission signals by using the obtained triangular matrix; and in the fourth step, the combination candidate for the first part and the combination candidate for the second part are selected so that the Euclidean distance between the combination candidate for the first part and the combination candidate for the second part is shortest;

wherein, values of lower right diagonal terms of the obtained triangular matrices are compared;

a pair of orders for arranging the channel impulse responses is specified in such an order that the absolute value of a lower right diagonal term of the compared obtained triangular matrices is largest; and the orders constituting the specified pair of the orders are specified as the first order and the second order of the first step.

2. A receiver, comprising:

a maximum likelihood decoding apparatus configured to separate received signals received by a plurality of antennas into a plurality of transmission signals;

a calculation unit configured to calculate log likelihoods of the plurality of transmission signals, obtained through the separation; and a decoding unit configured to decode the plurality of transmission signals, obtained through the separation, based on the calculated log likelihoods, wherein the maximum likelihood decoding apparatus includes:

a first operation module configured to arrange channel impulse responses corresponding to the received signals in a plurality of different orders;

a second operation module configured to specify a same number of parts as the plurality of different orders in which the channel impulse responses are arranged, wherein the received signals are placed in each of the parts;

a third operation module configured to generate channel matrices each having the channel impulse responses as matrix elements, by using the channel impulse responses arranged in the plurality of different orders, obtain triangular matrices by applying QR decomposition to the generated channel matrices, and determine at least one combination candidate for each of parts of the plurality of transmission signals by using the obtained triangular matrices; and a fourth operation module configured to select the combination candidates so that a Euclidean distance between the combination candidates determined by the third operation module is shortest;

wherein:

the first operation module arranges the channel impulse responses corresponding to the received signals in a first order and in a second order that is different from the first order;

the second operation module specifies a first part and a second part, wherein the received signals are placed in the first part and the second part;

the third operation module is configured to:

generate channel matrix having the channel impulse responses as matrix elements by using the channel impulse responses arranged in the first order, obtain a triangular matrix by applying the QR decomposition to the generated channel matrix, and determine at least one combination candidate for a first part of the plurality of transmission signals by using the obtained triangular matrix; and generate a channel matrix having the channel impulse responses as the matrix elements by using the channel impulse responses arranged in the second order, obtain a triangular matrix by applying the QR decomposition to the generated channel matrix, and determine at least one combination candidate for a second part of the plurality of transmission sigbals by using the obtained triangular matrix; and the fourth operation module selects the combination candidate for the first part and the combination candidate for the second part so that the Euclidean distance between the combination candidate for the first part and the combination candidate for the second part is shortest;

wherein the maximum likelihood decoding apparatus is configured to:

compare values of lower right diagonal terms of the obtained triangular matrices;

specify a pair of orders used to arrange the channel impulse responses in such an order that the absolute value of a lower right diagonal term of the compared obtained triangular matrices is largest; and specify the orders constituting the specified pair of the orders as the first order and the second order used by the first operation module.

* * * * *